United States Patent [19]

Gustavsson et al.

[11] Patent Number: 4,770,783

[45] Date of Patent: Sep. 13, 1988

[54] METHOD OF PROCESSING WASTE FROM A NUCLEAR POWER PLANT, SAID WASTE COMPRISING ION-EXCHANGE RESIN CONTAINING RADIOACTIVE METALS

[75] Inventors: Börje Gustavsson; Gunnar Hedin, both of Västerås, Sweden

[73] Assignee: Aktiebolaget Asea-Atom, Västerås, Sweden

[21] Appl. No.: 3,265

[22] Filed: Jan. 14, 1987

[30] Foreign Application Priority Data

Jan. 15, 1986 [SE] Sweden .................................. 8600165

[51] Int. Cl.⁴ ............................................. C02F 9/00
[52] U.S. Cl. ..................................... 210/638; 210/639;
210/665; 210/668; 210/669; 210/682; 210/721;
210/724; 210/751; 252/628; 252/631
[58] Field of Search ................ 210/638, 639, 651, 663,
210/665, 668, 682, 702, 751, 669, 721, 724;
252/628, 629, 631, 632, 633

[56] References Cited

U.S. PATENT DOCUMENTS 4,333,847 6/1982 Tran et al. .......................... 252/633
4,469,628 9/1984 Simmons et al. ................... 252/629

FOREIGN PATENT DOCUMENTS 0096342 12/1983 European Pat. Off. .

*Primary Examiner*—Ivars Cintins
*Attorney, Agent, or Firm*—Watson, Cole, Grindle & Watson

[57] ABSTRACT

Waste from a nuclear power plant, containing organic ion-exchange resin containing radioactive metals, is decomposed to form volatile substances by means of oxidation in an acid, aqueous liquid (8). Radioactive metal ions thus dissolved in the liquid, which are precipitable with hydroxide, are then caused to precipitate by the addition of a hydroxide (10) at a pH value of at least 9, and the metal compounds thus precipitated are separated from at least most of the liquid. Radioactive caesium and strontium ions in this liquid are removed therefrom. The liquid (24) separated from precipitated metal compounds and freed from caesium and strontium ions is released to a recipient, with the remaining substances still dissolved in it, and the precipitated metal compounds (11k, 11s) are solidified in a deposition container (22). The ion-exchange resin preferably consists at least partially of sulphonated ion-exchange resin and the hydroxide preferably of sodium hydroxide or some other alkali metal hydroxide.

12 Claims, 1 Drawing Sheet

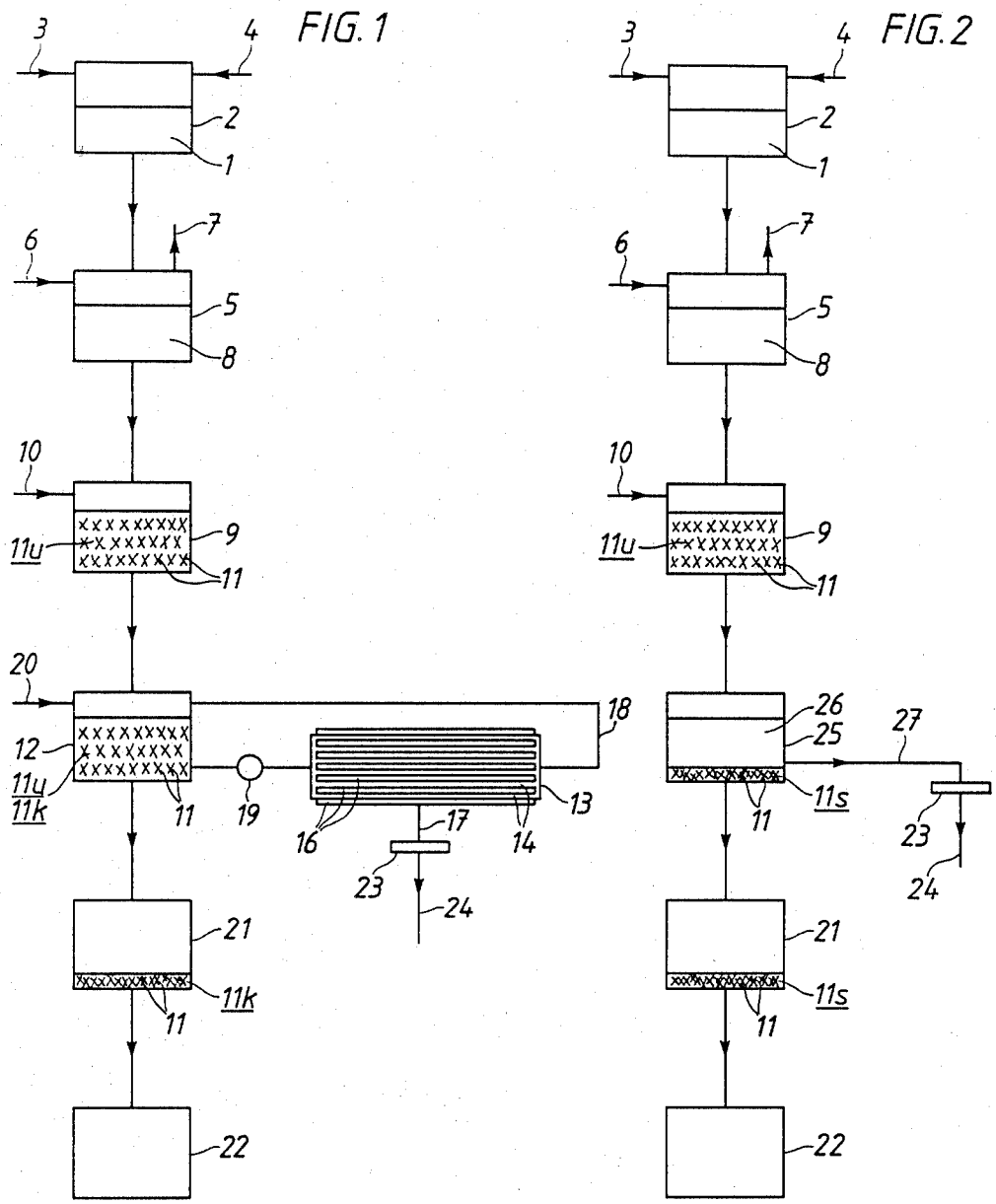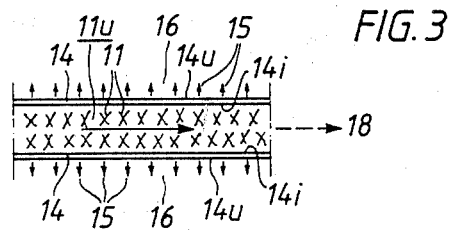

METHOD OF PROCESSING WASTE FROM A NUCLEAR POWER PLANT, SAID WASTE COMPRISING ION-EXCHANGE RESIN CONTAINING RADIOACTIVE METALS

BACKGROUND OF THE INVENTION

In nuclear power plants ionic impurities are normally removed from the water in the reactor primary system with the aid of ion-exchange filters containing ion-exchange resin. The impurities consist mainly of corrosion products from the construction material in the primary system, such as ions of or containing iron, manganese and chromium, which have become radioactive when the water containing these corrosions products passes the reactor core. The water in the primary system may also contain impurities in the form of fission products of reactor fuel, such as ions of caesium and strontium which have leaked out into the water. Even water outside the primary system, such as the water from floor drains and waste-water pipes, is normally subjected to purification in filters containing ion-exchange resin to remove radioactive impurities. After some time in use, the ion-exchange resin is spent and must be removed, solidified and safely stored.

Various methods are known for solidifying ion-exchange resin. One method is to mix the ion-exchange resin, considerably diluted with water, with cement in storage containers, usually concrete chills which are a cubic meter in size, and to allow the cement to solidify. Another method is to dry the ion-exchange resin, mix it with bitumen, and store it in sheet-metal barrels. Yet another method is, after drying the ion-exchange resin, to cast it in a plastic such as epoxy plastic or polyurethane plastic.

European patent application No. 0 096 342 describes a method of decomposing spent ion-exchange resin and solidifying the decomposition product with an inorganic binder. The object in this case is to effect a solidified product, entirely of inorganic material, having as little volume as possible. The ion-exchange resin is subjected to decomposition in an aqueous liquid by means of oxidation, "wet combustion", in the presence of an acid, such as sulphuric acid or nitric acid, and iron (III) ions. The oxidation agent may be hydrogen peroxide. The iron (III) ions functions as catalysts for the decomposition process. The temperature may be maintained at 80°-100° C. during decomposition and the pressure at atmospheric pressure. Decomposition of the ion-exchange resin releases volatile substances, primarily carbon dioxide, which is removed from the reaction vessel, while the aqueous phase will contain sulphate ions or other negative ions from the acid, from the catalyst and from groups included in the ion-exchange resin active at the ion-exchange reactions. In order to prevent the acid aqueous phase from corroding the equipment used during continued processing of the water phase, this phase is neutralized with sodium hydroxide so that the liquid will contain sodium salts, generally in the form of sulphate, as by far the dominant component weight-wise. The liquid is then subjected to concentration and evaporation to leave an inorganic material containing vast quantities of non-radioactive sodium salts. In the known case, this remainder is solidified in silicate, such as sodium silicate, or in cement. It is also known to effect decomposition using oxygen as the oxidation agent under high pressure, or with an oxidizing acid such as a mixture of sulphuric acid and nitric acid.

SUMMARY OF THE INVENTION

According to the present invention the aqueous solution obtained at the wet combustion is processed in quite a different manner from the known method. This enables the volume of a solidified product to be greatly reduced.

The invention comprises the following steps:

(a) the ion-exchange resin mixed with radioactive metals is decomposed to form volatile substances by means of oxidation in an acid, aqueous liquid, (b) radioactive metal ions dissolved in the liquid, which are precipitable with hydroxide, are thereafter caused to precipitate fully or substantially fully, by the addition of a hydroxide until the pH value of the liquid becomes at least 9, (c) the metal compounds precipitated by the addition of the hydroxide are separated from the liquid, (d) radioactive caesium and strontium ions in the liquid are removed therefrom, (e) the liquid separated from precipitated metal compounds, freed from caesium and strontium ions, but with the remaining substances still dissolved in it, is released to a recipient, i.e., a watercourse such as a river, lake or sea, to which the cooling water and waste water from the nuclear power plant is normally released.

When the precipitated metal compounds and the caesium and strontium ions have been removed from the liquid, it will still retain all the non-radioactive metal salts dissolved in it, usually sodium sulphate or some other alkali metal salt. Since this liquid can be released to the recipient, these non-radioactive metals will not be included with the radioactive metal compounds in the solidified product. The volume of the solidified product can therefore be greatly reduced, since in the known case these non-radioactive metal salts are the principal component.

The ion-exchange resin is preferably of polymer type, such as a cation exchanger consisting of a sulphonated polystyrene cross-linked with divinyl benzene, an anion exchanger consisting of a polystyrene cross-linked with divinyl benzene with quaternary ammonium groups and mixtures thereof. The invention is particularly suitable for use on cation exchangers in the form of a sulphonated ion-exchange resin and for mixtures of anion exchangers and such cation exchangers in which the content of cation exchanger is at least 1, preferably at least 10 percent by weight. The ion exchanger has a water-penetrable structure and is aqueous when it is received for decomposition according to the present invention. The dry solids content is normally around 20-30 percent by weight. Ion-exchange resin which has been embedded in an organic material, such as a urea formaldehyde resin, can also be treated in accordance with the present invention.

According to one method of effecting the decomposition, used in the known technology, the pH value of the aqueous ion-exchange resin is adjusted to a value of less than 3, preferably 2-2.5, by the addition of sulphuric acid or some other acid, such as nitric acid. A catalyst is also added to the aqueous ion-exchange resin, preferably in the form of iron (III) ion, such as sulphate, nitrate or acetate, if the resin does not already contain sufficient quantities of such a catalyst, absorbed during its cleaning function in the nuclear power plant. A suitable quantity of catalyst is 0.1–15 g, preferably 0.5–2 g, per 100 g dry ion-exchange resin. In this case hydrogen peroxide is used as oxidant and the decomposition is suitably performed at 75°–100° C., preferably 100° C., at atmospheric pressure for a few hours. The quantity of hydrogen peroxide added is suitably 1–10 g, preferably 2.5–5 g, per g dry ion-exchange resin. The quantity of dry ion-exchange resin is suitably 100–500, preferably 250–400 g per liter water.

Oxygen is used as oxidant according to another method of effecting the decomposition in the acid solution. In this case a high pressure, suitably 2–20 MPa, and a high temperature, suitable 200°–300° C., are used. A catalyst may also be used in the form of a metal ion such as Cu (II) ion.

According to yet another method of effecting the decomposition a mixture of concentrated sulphuric acid and concentrated nitric acid is used as oxidant at atmospheric pressure and 250°–300° C.

An alkali metal hydroxide, preferably sodium or potassium hydroxide, is suitably used for precipitation of the radioactive metal ions out of the acid solution. However, other hydroxides with good solubility in water, such as ammonium hydroxide, may also be used in certain cases. The pH value during precipitation is suitably 9–11.5, preferably 9.5–11. As already stated, sufficient hydroxide is added to effect complete or substantially complete precipitation of the radioactive metals. The radioactive metals are precipitated primarily in the form of hydroxides and oxides with possibly small quantities of other salts such as sulphates. Certain radioactive metals present in small quantities are precipitated together with the iron added as catalyst or deriving from the ion-exchange resin itself. Small quantities of a flocculation agent, e.g., in the form of polyelectrolytes, may possibly be added to the solution at the precipitation of the radioactive metal ions.

Caesium and strontium ions are not precipitated out when the hydroxide is added. However, special measures can be taken to cause the strontium ions to accompany the precipitated products. One such measure is the addition of large quantities of inactive strontium or barium, and also sulphate ions if these are not already in the solution, so that the radioactive strontium ions are precipitated out together with inactive strontium or barium ions since the solubility product of the sparingly soluble sulphate is exceeded. The caesium and strontium ions can also be caught by sorption in filters containing a selective adsorbent for caesium separation, e.g., a zeolite such as mordenite or chabazite, and a selective adsorbent for strontium separation, e.g., sodium titanate or a zeolite such as zeolite A. Such an operation is best performed after the liquid phase has been separated from the precipitate of the radioactive metal compounds. The sorbents used preferably have a particle size of 1–1000 μm.

Separation of the precipitated metal compounds can be effected by means of cross-flow filtration or by means of sedimentation, the liquid above the sedimented, precipitated compounds then being decanted. Other liquid phase - solid phase - separation methods, such as centrifugation are also possible.

If the precipitated metal compounds are to be solidified with cement, the water content shall be adjusted to preferably 40–80% of the total weight of precipitated metal compounds, any selective sorbents containing caesium and strontium which may have been added, and water. If solidification is to be performed in bitumen or plastic, the precipitated metal compounds and any selective sorbents containing caesium and strontium which may have been added shall be dried and evaporated to a dry solids content of 100% or substantially 100%. Solidification is effected by known means.

BRIEF DESCRIPTION OF THE DRAWINGS

The invention will be explained more fully by description of an embodiment by way of example, with reference to the accompanying drawings in which FIGS. 1 and 2 show schematically two installations for performing the method according to the invention, and FIG. 3 shows a detail from the means according to FIG. 1.

DETAILED DESCRIPTION OF THE PREFERRED EMBODIMENTS

A waste product from the primary system of a nuclear reaction, consisting of a mixture of 67 parts by weight cation exchanger (dry mass), 33 parts by weight anion exchanger (dry mass) and 300 parts by weight water. The cation exchanger comprises a sulphonated polystyrene cross-linked with divinyl benzene, the full formula being $C_{8,16}H_{8,16}(SO_3)_{0,92}$ and molecular weight 180. The anion exchanger comprises a polystyrene cross-linked with divinyl benzene with quaternary ammonium groups, the full formula being $C_{10,92}H_{16,44}(NO)_{0,92}$ and molecular weight 175.

The pH value of the water phase is 5 and the mixture contains 0.5 g iron (III) ions per 100 g dry ion-exchange resin. According to FIG. 1, sulphuric acid is added to the mixture 1 in the vessel 2 from a pipe 3 until the pH value is reduced to 2 and iron (III) sulphate is added from a pipe 4 until the content of iron (III) ions reaches 1 g per 100 g dry ion-exchange resin.

The mixture from vessel 2 is subjected to wet combustion in vessel 5. Here, hydrogen peroxide is added continuously to the vessel in the form of a 50% (by weight) water solution of $H_2O_2$ via a pipe 6. The temperature in the vessel is maintained at 100° C. and the pressure at atmospheric pressure. The volume of the reaction mixture is maintained substantially constant by condensing departing steam, and returning a part of the condensate. The total quantity of hydrogen peroxide added is 4 g $H_2O_2$ per g dry ion-exchange resin. After some hours the organic ion-exchange resin has decomposed, producing water and carbon dioxide, removed via the pipe 7, while the radioactive metals taken up by the ion-exchange resin in the primary system of the reactor are dissolved in the acid solution 8.

The contents of vessel 5 is then transferred to vessel 9, where an aqueous solution of sodium hydroxide containing 45 percent by weight NaOH is added through pipe 10 until the pH value of the solution becomes 10. The radioactive metals except for caesium and strontium are then completely or substantially completely precipitated out of the solution, giving a slurry 11u of the precipitated metal resins 11.

The slurry 11u is then transferred to vessel 12. This vessel is connected to a cross-flow filter 13 containing a very large number of membranes in the form of tubes 14 of polypropene felt or polypropene film, the membrane pores having a pore size of 0.2 μm. The tubes have an inner diameter of 5.5 mm and a length of a few meters. Part of such a tube is shown in cross section in FIG. 3. The slurry is conducted into the tube, i.e., to one side of the membrane, the inlet side 14i, and is divided into one flow, the permeate flow, which penetrates through the membrane from the inlet side to the other side, the outlet side 14u, and a second flow, the reject, which passes along the membrane on the inlet side. The permeate 15 passes into the space 16 outside the tubes 14. Space 16 communicates with pipe 17. The reject is returned via pipe 18 to vessel 12 (FIG. 1). The reject is circulated by pump 19 through cross-flow filter 13 and vessel 12 until water content is sufficiently low in the concentrated product, the concentrate 11k, obtained in vessel 12, to make it suitable for solidification in cement, either directly or after some evaporation. A suitable flow rate for the liquid in the tubes is about 2 m/s and a suitable pressure difference between the inside and outside of the membrane is approximately 0.3 MPa. To prevent the precipitated metal compounds from clogging the membranes before the desired quantity of water has been removed from the slurry 11u, a suitable flow rate (of the reject) along the membrane is at least 0.5 m/s for all types of slurries processed by means of the present invention. Before the concentrate is solidified it is suitably subjected to washing with water to reduce the content of soluble salts. The water used for washing is supplied to the concentrate via pipe 20. The diluted concentrate is circulated through the cross-flow filter until the concentration is substantially the same as before the water was added for washing. The washing water is withdrawn via pipe 17.

If the concentrate 11k is to be evaporated this is done in the dryer 21 to a water content of 50 percent by weight, after which 2.5 parts by weight cement is added per part by weight water, in a concrete chill 22. The contents of the chill is then allowed to set, forming a solidified product.

The permeate is conducted from pipe 17 through a bed 23 containing a selective sorbent for caesium, such as zeolite in the form of mordenite or chabazite, having a particle size of 100–1000 μm, preferably 300–900 μm, and a selective sorbent for strontium, such as sodium titanate or zeolite in the form of zeolite A, having a particle size of 100–1000 μm, preferably 300–900 μm. The liquid leaving through pipe 24, comprising essentially a sodium sulphate solution, is ready for release to a recipient. The quantity of selective sorbent for caesium and strontium required is extremely small and, after consumption, provides a negligible addition to the concentrate 11k for solidification in chill 22.

The same starting product as above can be processed in the manner described with reference to FIG. 2. The processing in vessels 2, 5 and 9 is the same as for the case described with reference to FIG. 1. In the case illustrated in FIG. 2, the slurry 11u is transferred to vessel 25 where the precipitated metal compounds are allowed to settle and form a sedimented product 11s, while the clear water solution 26, now containing caesium and strontium ions, is decanted through pipe 27. This solution is passed through a bed 23 of the same type as the bed 23 in FIG. 1. The liquid leaving through pipe 24, comprising essentially a sodium sulphate solution, can now be released to a recipient. The sedimented product 11s is thereafter washed with water to reduce the content of soluble salts. The washing water is decanted and withdrawn via pipe 27. The washed and sedimented product 11s is dried to a water content of 50 percent by weight, after which it is solidified with cement in a concrete chill 22 in the same way as described with reference to FIG. 1.

In the examples given waste consisting of a mixture of 20 parts by weight cation resin and 10 parts by weight anion resin embedded in 70 parts by weight urea formaldehyde resin may be used instead of the waste described which consists of a mixture of cation and anion resins.

We claim:

1. A method of processing waste from a nuclear power plant, said waste containing an ion-exchange resin that includes radioactive metals which are precipitatable as precipitated compounds, primarily in the form of oxides and hydroxides, radioactives caesium and radioactive strontium, said method including the steps of
   (1) forming a mixture of said waste in an acid-containing aqueous liquid,
   (2) oxidizing said waste in said acid-containing aqueous liquid to form volatile substances and a solution containing radioactive metal ions,
   (3) adding sufficient hydroxide to said solution to increase its pH is to at least 9, thereby causing said radioactive metals therein which are precipitatable to form precipitated compounds, thereby providing a slurry of liquid and precipitated compounds,
   (4) separating said precipitated compounds from at least most of said liquid,
   (5) removing said caesium and strontium from said liquid from step (4),
   (6) passing said liquid from step (5) to a recipient,
   (7) forming a mixture of said separated precipitated compounds with a material capable of forming a solid mass, and
   (8) causing the mixture of step (7) to solidify into a solid mass.

2. A method according to claim 1, wherein said waste includes sulphonated ion-exchange resin.

3. A method according to claim 1, wherein in step (4) said slurry is passed through a cross flow filter containing a water-permeable membrane, most of the liquid in said slurry passing through said water-permeable membrane as permeate and said precipitated compounds being contained in a reject product which does not pass through said water-permeable membrane.

4. A method according to claim 1, including between steps (4) and (7) the step of adjusting the water content of said separated precipitated compounds to 40–80% by weight, and wherein in step (7) said separated precipitated compounds are mixed with cement.

5. A method according to claim 1, including between steps (4) and (7) the step of drying said separated precipitated compounds to a dry solid content of substantially 100% and wherein in step (7) said separated precipitated compounds are mixed with bitumen or plastic.

6. A method according to claim 1, wherein in step (4) said slurry is passed to a sedimentation vessel wherein said precipitated hydroxides settle to the bottom thereof and the liquid thereabove is decanted out of said vessel.

7. A method according to claim 1, wherein in step (5) said liquid is passed through a bed containing sorbent for caesium, and including the step of adding said sorbent containing caesium to the mixture in step (7) such that it is solidified in said solid mass in step (8).

8. A method according to claim 1, wherein in step (5) said liquid is passed through a bed containing a sorbent for strontium, and including the step of adding said sorbent containing strontium to the mixture in step (7) such that it is solidified in said solid mass in step (8).

9. A method according to claim 1, wherein said waste includes a styrene divinyl benzene-type cation exchange resin containing sulphonic acid groups.

10. A method according to claim 1, wherein the mixture formed in step (1) includes iron(III) ions and wherein in step (2) hydrogen peroxide is added to said acid-containing, waste-containing solution.

11. A method according to claim 1, wherein in step (3) an alkali metal hydroxide is added to said solution.

12. A method according to claim 11, wherein said alkali metal hydroxide is sodium hydroxide.

* * * * *